(12) United States Patent
Holt et al.

(10) Patent No.: US 9,111,454 B2
(45) Date of Patent: Aug. 18, 2015

(54) ASSOCIATING DIVERSE CONTENT

(75) Inventors: Laurence Holt, Brooklyn, NY (US); Olivier Pomel, New York, NY (US)

(73) Assignee: Wireless Generation, Inc., Brooklyn, NY (US)

( * ) Notice: Subject to any disclaimer, the term of this patent is extended or adjusted under 35 U.S.C. 154(b) by 157 days.

(21) Appl. No.: 12/877,627

(22) Filed: Sep. 8, 2010

(65) Prior Publication Data
US 2011/0076664 A1 Mar. 31, 2011

Related U.S. Application Data

(60) Provisional application No. 61/240,525, filed on Sep. 8, 2009.

(51) Int. Cl.
G09B 7/00 (2006.01)

(52) U.S. Cl.
CPC .................................... *G09B 7/00* (2013.01)

(58) Field of Classification Search
CPC ...................... G06F 17/2715; G06F 17/2785
USPC ......................................................... 434/362
See application file for complete search history.

(56) References Cited

U.S. PATENT DOCUMENTS

| | | | |
|---|---|---|---|
| 6,496,681 B1 * | 12/2002 | Linton | 434/350 |
| 6,813,474 B2 | 11/2004 | Robinson et al. | |
| 7,107,254 B1 * | 9/2006 | Dumais et al. | 706/50 |
| 7,266,340 B2 | 9/2007 | Bresciani | |
| 2002/0164563 A1 * | 11/2002 | Wasowicz et al. | 434/178 |
| 2004/0063085 A1 * | 4/2004 | Ivanir et al. | 434/322 |
| 2004/0110119 A1 | 6/2004 | Riconda et al. | |
| 2005/0015291 A1 * | 1/2005 | O'Connor | 705/8 |
| 2005/0114160 A1 * | 5/2005 | Boehme et al. | 705/1 |
| 2007/0202481 A1 * | 8/2007 | Smith Lewis et al. | 434/323 |
| 2008/0050712 A1 * | 2/2008 | Madani et al. | 434/350 |
| 2008/0254433 A1 * | 10/2008 | Woolf et al. | 434/332 |
| 2009/0280465 A1 | 11/2009 | Schiller | |
| 2009/0311657 A1 * | 12/2009 | Dodelson et al. | 434/350 |
| 2010/0311033 A1 * | 12/2010 | Jain et al. | 434/362 |

OTHER PUBLICATIONS

Rafaeli et al., "QSIA—a Web-based environment for learning, assessing and knowledge sharing in communities," Computer & Education, vol. 43, Issue 3, pp. 273-289, Nov. 2004, Elsevier (abstract only).
PCT Notification of Transmittal of the International Search Report and the Written Opinion of the International Searching Authority for International Application No. PCT/US10/48156 dated Nov. 22, 2010 (12 pages).
Office Action issued in GB1205753.5 on Apr. 2, 2013, 4 pages.
International Preliminary Report on Patentability in International Application No. PCT/US2010/048156, 11 pages.
Office Action issued in AU Application No. 2010292337, issued Jun. 14, 2014, 3 pages.
Office Action in GB Application No. 1205753.5, dated Jan. 27, 2014, 4 pages.

\* cited by examiner

*Primary Examiner* — Sam Yao
*Assistant Examiner* — Thomas Hong
(74) *Attorney, Agent, or Firm* — Fish & Richardson P.C.

(57) ABSTRACT

Diverse content items from within a network of federated systems is managed to allow automatic access of related content items from within the network based on access of a first content item. The related content items are ranked according to various criteria for relatedness and/or quality.

20 Claims, 7 Drawing Sheets

Figure 4

ASSOCIATING DIVERSE CONTENT

RELATED APPLICATION

This patent application is related to, and claims priority to and the full benefit of, U.S. provisional patent application Ser. No. 61/240,525 filed Sep. 8, 2009, and titled "Associating Diverse Content," which is incorporated herein in its entirety.

FIELD

This document relates to associating diverse content.

BACKGROUND

In order to understand or utilize certain information, diverse but related information can sometimes provide assistance. For example, in an education context, instructors may benefit from the insights of other instructors when making decisions regarding how to approach instruction of a particular topic, such as when a student's performance does not fall within an expected range. In such circumstances, among others, an instructor may benefit from information regarding the observed performance, such as information regarding an organization's best practices, or information regarding the recommendations of other instructors.

SUMMARY

In one general aspect, a system includes one or more processors; and one or more storage devices, the storage devices including executable instructions that, when executed by one or more processors, causing the system to perform operations including: causing a display of information reflecting performance of at least one student, the information being determined based on educational assessment data for the student, determining that the educational assessment data for the student is in a first one of multiple educational assessment data formats, determining, based on the determination that the educational assessment data is in the first educational assessment data format, a first set of context signatures specific to the first educational assessment data format from multiple sets of context signatures corresponding to the multiple educational assessment data formats, wherein the context signatures in the first set of context signatures correspond to potential educational contexts of the information reflecting performance of the student, analyzing the educational assessment data for the student based on the first set of context signatures to detect at least one of the context signatures, based on the analysis of the educational assessment data, detecting at least one of the context signatures, identifying a set of content items related to the educational context corresponding to the detected context signature, and causing the identified set of content items to be displayed with the information reflecting performance of the student.

Implementations can include one or more of the following features. For example, the operations may further include ranking the identified content items based on at least one of instructor effectiveness information associated with authors of one or more of the identified content items, student performance information associated with authors of one or more of the identified content items, student performance information associated with students that viewed the content items, or social network information of a user associated with the display of the information reflecting performance of the student, and causing the identified set of content items to be displayed with the information reflecting performance of the student includes causing the identified content items to be displayed the in rank order. The educational assessment data may include information regarding student performance for at least two tested skills, and detecting a context signature may include determining that the information regarding student performance for the at least two tested skills corresponds to performance levels of the context signature for the at least two tested skills. The operations may further include accessing remote content items, analyzing the remote content items to determine corresponding educational contexts for the remote content items, and updating an index based on the determined educational contexts, wherein the index associates the determined educational contexts with the remote content items. The operations may further include storing a canonical representation of each of the remote content items. The remote content items may be located in multiple systems that are managed by different school systems. The operations may further include causing a second display of second information reflecting performance of at least one second student, the second information being determined based on second educational assessment data for the second student, determining that the second educational assessment data for the second student is in a second one of the multiple educational assessment data formats, determining, based on the determination that the second educational assessment data is in the second educational assessment data format, a second set of context signatures specific to the second educational assessment data format from the multiple sets of context signatures corresponding to the multiple educational assessment data formats, wherein the context signatures in the second set of context signatures correspond to potential educational contexts of the second information reflecting performance of the second student, analyzing the second educational assessment data for the second student based on the second set of context signatures to detect at least one of the context signatures of the second set of context signatures, based on the analysis of the second educational assessment data, detecting at least one of the context signatures of the second set of context signatures, identifying a second set of content items related to the second educational context corresponding to the detected context signature of the second set of context signatures, and causing the second set of identified content items to be displayed with the second information reflecting performance of the second student. The information may be displayed at a client system associated with a first school system, and the second information may displayed at a second client system associated with a second school system.

In another general aspect, a method includes causing a display of information reflecting performance of at least one student, the information being determined based on educational assessment data for the student, determining that the educational assessment data for the student is in a first one of multiple educational assessment data formats, determining, based on the determination that the educational assessment data is in the first educational assessment data format, a first set of context signatures specific to the first educational assessment data format from multiple sets of context signatures corresponding to the multiple educational assessment data formats, wherein the context signatures in the first set of context signatures correspond to potential educational contexts of the information reflecting performance of the student, analyzing the educational assessment data for the student based on the first set of context signatures to detect at least one of the context signatures, based on the analysis of the educational assessment data, detecting at least one of the context signatures, identifying a set of content items related to the educational context corresponding to the detected context signature, and causing the identified set of content items to be displayed with the information reflecting performance of the student.

Implementations can include one or more of the following features. For example, the method may also include ranking the identified content items based on at least one of instructor effectiveness information associated with authors of one or more of the identified content items, student performance information associated with authors of one or more of the identified content items, student performance information associated with students that viewed the content items, or social network information of a user associated with the display of the information reflecting performance of the student, and causing the identified set of content items to be displayed with the information reflecting performance of the student includes causing the identified content items to be displayed the in rank order. The educational assessment data may include information regarding student performance for at least two tested skills, and detecting a context signature includes determining that the information regarding student performance for the at least two tested skills corresponds to performance levels of the context signature for the at least two tested skills. The method may also include accessing remote content items, analyzing the remote content items to determine corresponding educational contexts for the remote content items, and updating an index based on the determined educational contexts, wherein the index associates the determined educational contexts with the remote content items. The method may also include storing a canonical representation of each of the remote content items. The remote content items may be located in multiple systems that are managed by different school systems. The method may also include causing a second display of second information reflecting performance of at least one second student, the second information being determined based on second educational assessment data for the second student, determining that the second educational assessment data for the second student is in a second one of the multiple educational assessment data formats, determining, based on the determination that the second educational assessment data is in the second educational assessment data format, a second set of context signatures specific to the second educational assessment data format from the multiple sets of context signatures corresponding to the multiple educational assessment data formats, wherein the context signatures in the second set of context signatures correspond to potential educational contexts of the second information reflecting performance of the second student, analyzing the second educational assessment data for the second student based on the second set of context signatures to detect at least one of the context signatures of the second set of context signatures, based on the analysis of the second educational assessment data, detecting at least one of the context signatures of the second set of context signatures, identifying a second set of content items related to the second educational context corresponding to the detected context signature of the second set of context signatures, and causing the second set of identified content items to be displayed with the second information reflecting performance of the second student. The information may be displayed at a client system associated with a first school system, and the second information may be displayed at a second client system associated with a second school system.

In another general aspect, a tangible computer-readable medium has executable instructions stored thereon, the instructions, when executed by one or more processors, cause a content service system to perform operations including: causing a display of information reflecting performance of at least one student, the information being determined based on educational assessment data for the student, determining that the educational assessment data for the student is in a first one of multiple educational assessment data formats, determining, based on the determination that the educational assessment data is in the first educational assessment data format, a first set of context signatures specific to the first educational assessment data format from multiple sets of context signatures corresponding to the multiple educational assessment data formats, wherein the context signatures in the first set of context signatures correspond to potential educational contexts of the information reflecting performance of the student, analyzing the educational assessment data for the student based on the first set of context signatures to detect at least one of the context signatures, based on the analysis of the educational assessment data, detecting at least one of the context signatures, identifying a set of content items related to the educational context corresponding to the detected context signature, and causing the identified set of content items to be displayed with the information reflecting performance of the student.

Implementations can include one or more of the following features. For example, the operations may further include: ranking the identified content items based on at least one of instructor effectiveness information associated with authors of one or more of the identified content items, student performance information associated with authors of one or more of the identified content items, student performance information associated with students that viewed the content items, or social network information of a user associated with the display of the information reflecting performance of the student, and causing the identified set of content items to be displayed with the information reflecting performance of the student includes causing the identified content items to be displayed the in rank order. The educational assessment data may include information regarding student performance for at least two tested skills, and detecting a context signature includes determining that the information regarding student performance for the at least two tested skills corresponds to performance levels of the context signature for the at least two tested skills. The operations may further include: accessing remote content items, analyzing the remote content items to determine corresponding educational contexts for the remote content items, and updating an index based on the determined educational contexts, wherein the index associates the determined educational contexts with the remote content items. The operations may further include storing a canonical representation of each of the remote content items. The remote content items may be located in multiple systems that are managed by different school systems. The operations may further include: causing a second display of second information reflecting performance of at least one second student, the second information being determined based on second educational assessment data for the second student, determining that the second educational assessment data for the second student is in a second one of the multiple educational assessment data formats, determining, based on the determination that the second educational assessment data is in the second educational assessment data format, a second set of context signatures specific to the second educational assessment data format from the multiple sets of context signatures corresponding to the multiple educational assessment data formats, wherein the context signatures in the second set of context signatures correspond to potential educational contexts of the second information reflecting performance of the second student, analyzing the second educational assessment data for the second student based on the second set of context signatures to detect at least one of the context signatures of the second set of context signatures, based on the analysis of the second educational assessment data, detecting at least one of the context signatures of the second set of context signatures, identifying a second set of content items related to the second educational context corresponding to the detected context signature of the second set of context signatures, and causing the second set of identified content items to be displayed with the second information reflecting performance of the second student. The information may be displayed at a client system associated with a first school system, and the second information may be displayed at a second client system associated with a second school system.

The details of one or more implementations are set forth in the accompanying drawings and the description below. Other features will be apparent from the description and drawings, and from the claims.

DESCRIPTION OF THE DRAWINGS

FIGS. 3-5 are diagrams of graphical user interfaces for associating content items.

DETAILED DESCRIPTION

In certain systems, or in certain environments, information contained in or represented by some content items may be best understood and/or used in combination with information contained in or represented by other content items. For example, in an educational environment, student performance, instructor effectiveness, or other assessment information contained in or represented by assessment data may be best understood in combination with explanatory content that describes or summarizes the assessment data. The description or summary can be specific, such as where the explanatory content is statistical information representing a comparison of the assessment data with other assessment data, such as assessment data for other students and/or other times, or the description or summary can be generic, such as where the explanatory content describes generally the significance of different aspects of the assessment data. In addition, or alternatively, it may be useful to have easy access to content items related to the assessment data, such as content items that describe the subject matter of the assessment, lesson plans for instruction of the subject matter of the assessment, or educational material for the instructor regarding the subject matter.

Figure 5:
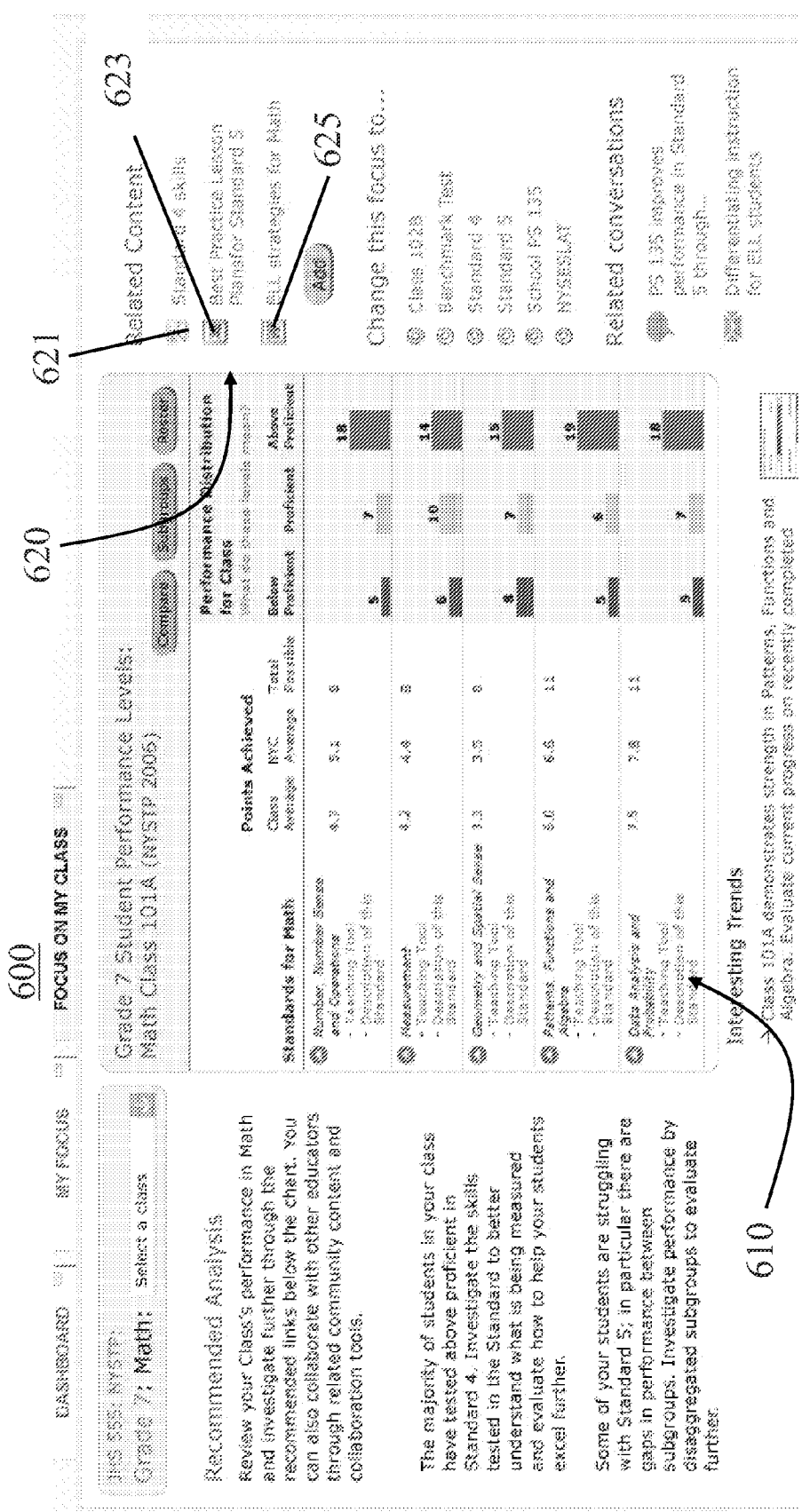

For example, with reference to FIG. 5, an instructor can access display 600 that includes a first area 610 that shows summary indications of student performance reflected by assessment data for a 7$^{th}$ grade math assessment. Specifically, average performance levels for a class of students are displayed in each of five standard skill areas and a breakdown of the number of students in the class whose assessment data indicates one of three levels of proficiency in each of the five standard skill areas are displayed. The instructor can review the performance indications to learn about the students' performance, and compare the class performance to a comparative metric, such as school-wide average performance levels. In order to assist the instructor to generally learn more about the 7$^{th}$ grade math assessment, a link 621 to a document including an explanation of the five standard skill areas is available. By following the link 621, the instructor can learn about the skills that are tested in each of the five standard skill areas. In order to help the particular students in the class improve their assessment scores and better understand the tested math skills, the instructor can follow a link 623 to a set of lesson plans that reflect the best practices of the school. Additionally, the instructor can follow the link 625 to access continuing education materials designed to improve the instructor's effectiveness in teaching the tested skills to the students of the class. Each of the links 621-625 is formed as an icon indicating the type and/or format of the related content item and includes a brief description of the related content item.

Some content items, such as generic summary or explanatory content items, may be recognized as related to other content items, such as the content item which is summarized or explained. For example, a book review can be identified as being related to the book which is reviewed. In some environments, when accessing a content item, users may wish to automatically receive links to other related content items, such as in the display 600. In some implementations, a preview of the related content item, or even a display of the entire content item may be provided, as is illustrated in area 420 of display 400 of FIG. 3.

Figure 1:
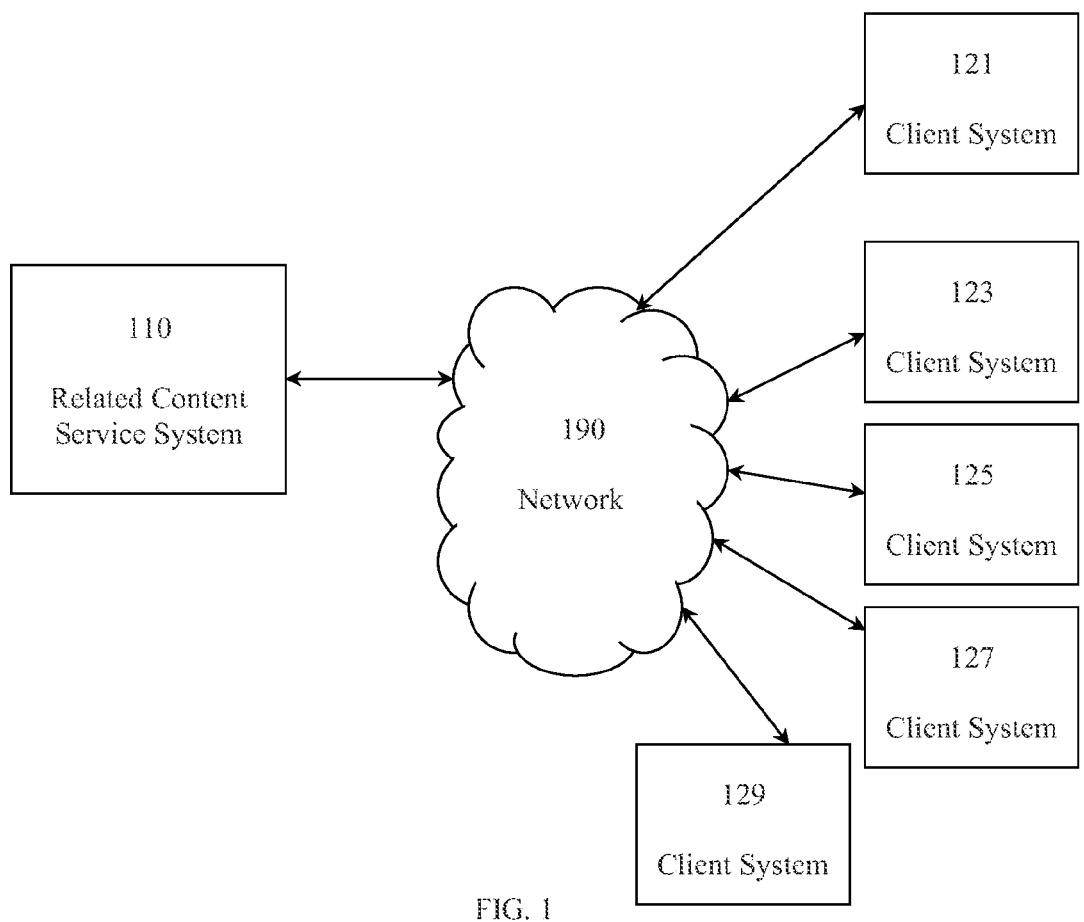
FIG. 1 is a diagram of a system for associating diverse content.
Figure 2:
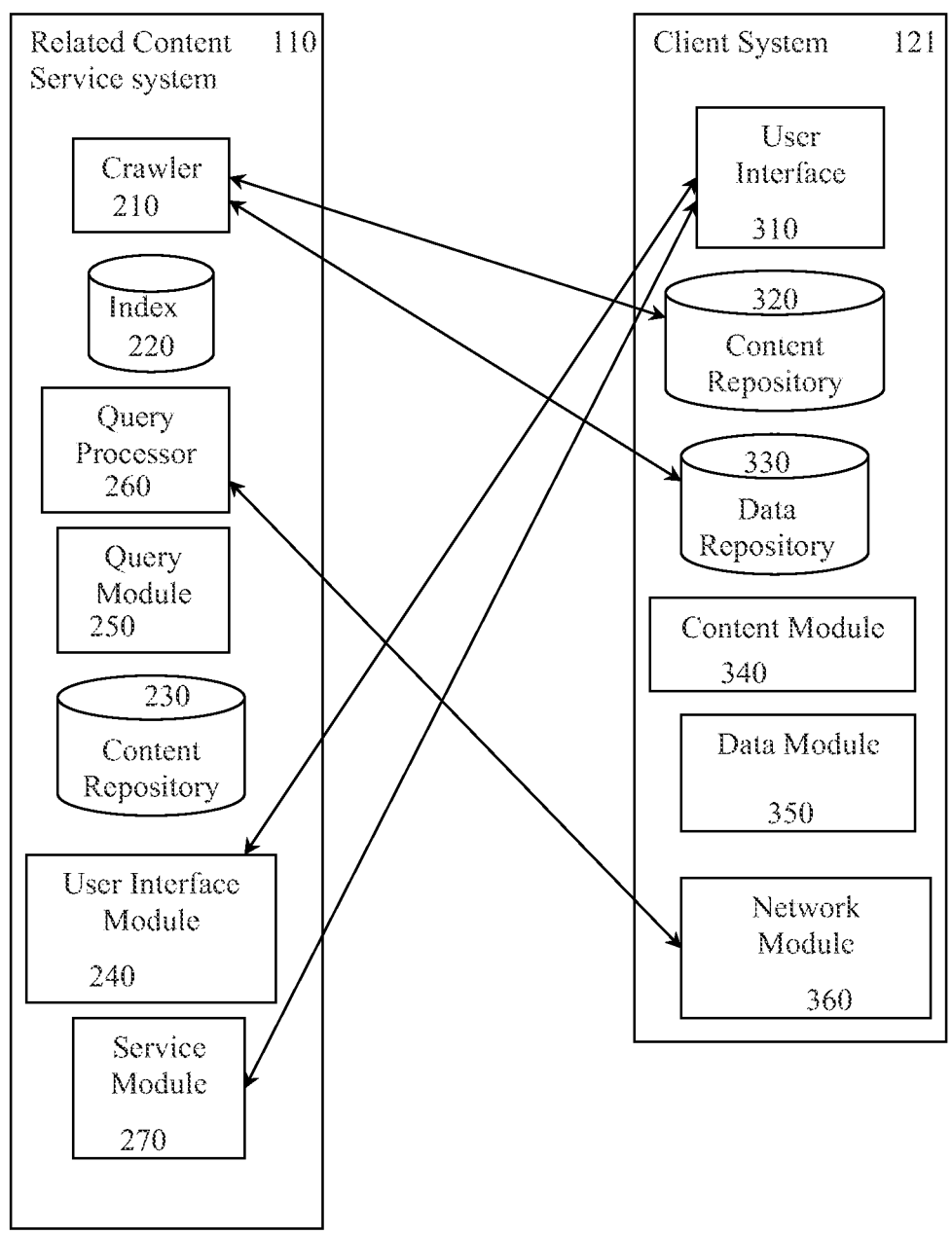
FIG. 2 is a diagram of a related content service system and a client system of FIG. 1.
Figure 3:
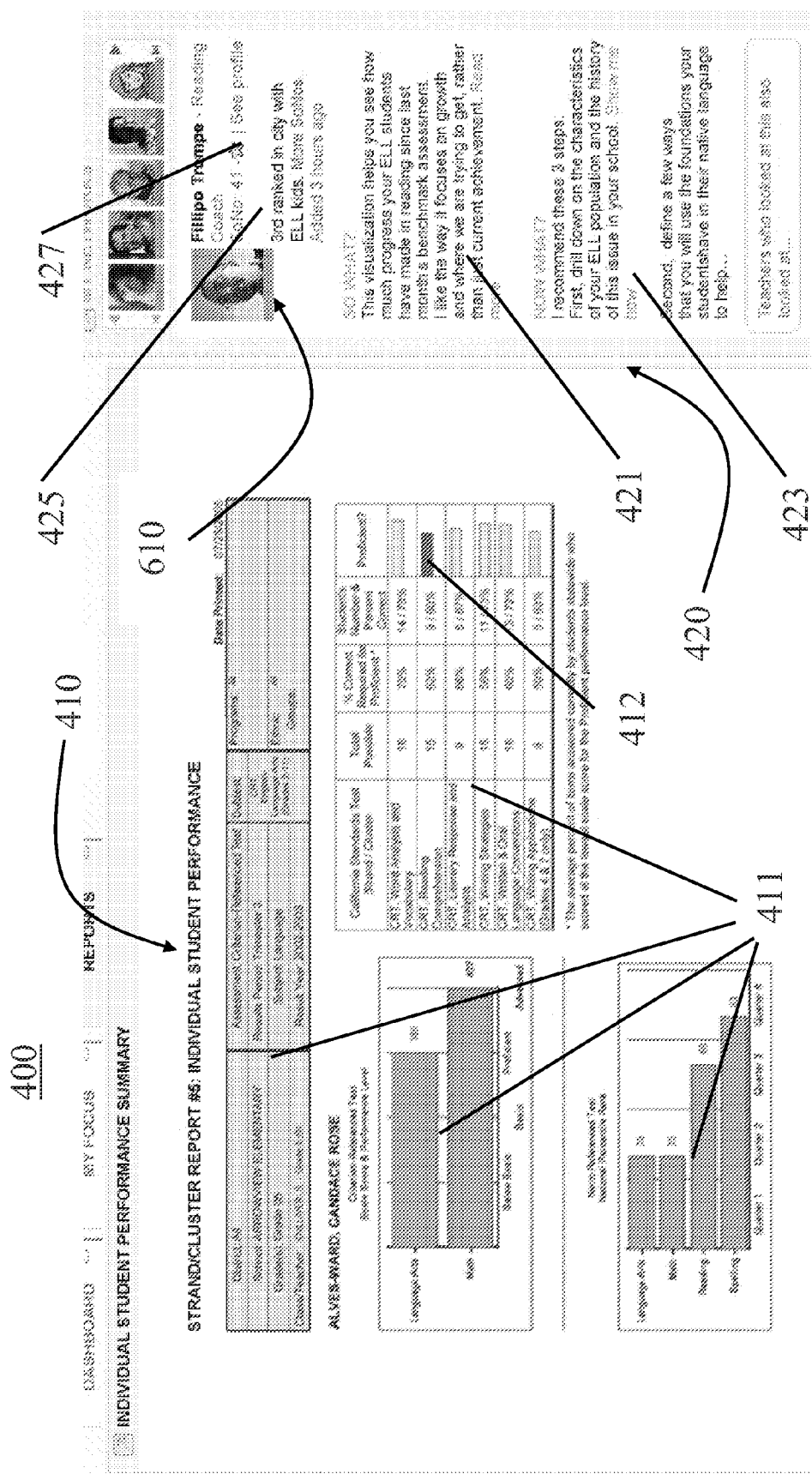

In some instances, related content items may be spread across institutions that do not directly share access to their respective content items, and different educational institutions may employ different tests or assessment standards for assessing skills, which may create difficulties in identifying the pieces of related content items as such. With reference to FIGS. 1-3, system 100 includes a related content service system 110 and client systems 121-129 that include content items in various formats, such as web pages, word processing documents, videos, and graphic files, among others. The related content service system 110 can communicate with the client systems 121-129 over a network 190, such as the Internet. The client systems 121-129 are educational computer systems of various schools, school districts, state education agencies, and/or subsystems thereof and the related content service system 110 can access and distribute content items among the client systems 121-129 over the network 190. In other words, in some implementations, at least some of the client systems 121-129 are part of different schools or school districts that typically use separate systems, but the related content server system 110 connects the various schools or districts so that various documents, which are typically only available to a given school system, can be made available to other connected school systems.

The related content service system 110 can search for content items across the client systems 121-129 that are related to educational assessment information being displayed to a user. For example, in some implementations, the related content service system 110 includes a crawler 210, an index 220, a content repository 230, a user interface module 240, a query service module 250, a query processor 260, and a user interface service module 270.

The crawler 210 is operable to access the content repository 320 to retrieve documents and metadata regarding the documents and to access the data repository 330 to retrieve instructor effectiveness and student achievement metrics. The crawler applies categorization and ranking algorithms on this data, and stores the results in the index 220. The crawler 210 also stores a canonical representation of the content items in the content repository 230 for use in distributing the content items to others of the client systems 123-129, including through read-only or view-only access or through delivery of restricted or unrestricted copies of the related content items.

The query processor 260 implements a faceted search engine that processes search queries against the index 220 and performs ranking and/or filtering of the results, which may be based on additional datasets not stored as part of the index 220, such as social networking information. The query service module 250 provides a mechanism through which an application submits queries for processing by the query processor 260. The query service module 250 is, for example, a REST or SOAP web service.

The user interface (UI) module 240 provides a UI allowing content to be read from the content repository 230 and displayed to users who may not have the same content management system. The UI module 240 uses a canonical representation of the document and respects access control and sharing rules set by the content owners. The UI includes controls that allow ratings and usage feedback to be captured, added to the index 220 and, if applicable, added to the content repository 320 or other source content management system. The UI service module 270 provides APIs for applications to access to the UI module 240.

One or more of the client systems 121-129, such as client system 121, are configured to provide selected services to users of the client system. For example, client system 121 provides an instructor or an administrator access to various data, such as assessment and/or effectiveness data for one or more students and/or one or more instructors, as well as provides access to other content items, such as lesson plans, recommended activities, or best practices information, among others. To enable these or other features, the client system 121 includes a user interface 310, a data module 350 (e.g., a business intelligence tool), a data repository 330, a content module 340 (e.g., a content management tool), and a content repository 320.

The content repository 320 contains documents, such as multimedia files, including audio, video, and graphic files, text files, including articles and lesson plans, and/or html files, including files for Internet web pages including multimedia material, articles, lesson plans, or other materials. The data repository 330 stores instructor effectiveness data and student assessment data. The content module 340 provides access to the content items in the content repository 320. The data module 350 provides reports and other analysis of the instructor effectiveness data and the student assessment data.

The user interface component 310 integrates with the content module 340 and/or data module 350 and interacts with the related content service system 110 to provide a display of content items related to the content displayed using the content module 340 and/or data module 350. For instance, the user interface 310 may employ the data module 350 to display a student or class assessment report and then extract context information from the data presented to the user, pass this context information to the query service module 250, which would form a query and employ the query processor 260 to conduct the query against the index 220. The query service module 250 returns the results of the search to the user interface 310, which then communicates with UI service module 270 to display the results of the search and enable access to the related content items returned as results of the search.

One or more of the components of the related content service system 110 and/or the client systems 121-129 can be implemented in one or more computer systems, such as the computer system 700 of FIG. 6, discussed in greater detail below.

In one example, the crawler 210 may access the content repository 320 in response to a request for crawling, or in response to the addition of one or more new pieces of content to the content repository 320. The request may be generated by the content module 340 automatically based on a user's use of the content module 340 to create, access, and/or modify one or more content items in the content repository 320. Alternatively, the crawler 210 may access the content repository periodically to determine whether any content item has been added to the content repository 320. When a new content item is identified, including when a content item is modified, or updated, the crawler 210 reads the content item in its native format and determines appropriate educational-related topics, categories, or patterns, more generally, contexts that are related to the content item. The topics, categories, or patterns may not be content specific, but instead are general across the system 100. For example, the crawler 210 may determine that the information of a content item in a specific format relates to a pattern of information, such as "$2^{nd}$ grade wall," which refers to a phenomenon in which students in grades 1 through 3 demonstrate fluency in a decoding skill and a deficiency in a reading comprehension skill. Based on this determination, the crawler 210 indexes the content item in the index 220 as related to the pattern "$2^{nd}$ grade wall."

In some implementations, the crawler 210 can make determinations based on explicit context identification, implicit context identification, and/or combinations thereof. In identifying the contexts of content items, the crawler 210 can analyze the data, text, metadata, tags, ratings, and/or usage information of the content items. For example, an author of a content item may tag the content item as being related to one or more topics, categories, patterns, or other contexts, and the crawler 210 can identify the tags and index the content item as related to the contexts identified by the tag information. Additionally, the text of the content item can be analyzed to determine commonly recurring keywords, and/or keywords occurring in prominent locations, such as in the title or headings. Based on the keywords, the crawler can determine related contexts for the content item. The contexts of the content items can include categories for different performance levels, such as "proficient" or "at risk". Different skills or topics of knowledge can also be reflected by different topics, such as "math," "reading comprehension," or "blending skill." The contexts of the content items can also include categories for different student characteristics, such as "$2^{nd}$ grade" or "English language learning." Similarly, different instructor or school characteristics can be associated with respective contexts of the content items.

The crawler 210 can also rank the content item with respect to each related index context, and store an indication of the rank of the content item for each related index context. For example, the content item discussed above relating to teaching math to English language learning students, authored by the first educator, can be ranked by the crawler 210 relative to other content items that relate to the same contexts or the same combination of contexts, such as using a ranking score based on a scale of 0 to 100, or a number of stars out of five. In one example, the crawler 210 can rank the content items based on a measure of strength of relatedness to the topic. For example, a content item that uses a particular keyword frequently and in prominent locations may be ranked higher for a context related to the keyword than another content item that uses the keyword less frequently or less prominently, although both items may be indexed as being related to the context. Optionally, the crawler 210 can also access the data repository 330 to obtain effectiveness data relating to the author of the content item. The crawler 210 can then rank the content items based on a measure of effectiveness of the author in achieving desired results, such as high assessment scores, in teaching math to English language learning students.

The user interface module 240 is operable to allow access to the related content service system 110 to a user, such as through the user interface 310 of the client system 121. Thus, the user interface module 240 receives information, including requests for related content items, from the client system, and provides indications of selected related content items for display to the user. The user interface module 240 can also receive requests for selected ones the indicated related content items. For example, an instructor can view student assessment data and/or instructor effectiveness data stored in the data repository 330 that is associated with one or more students and/or instructors. The user interface 310 may provide a display, such as display 400 of FIG. 3, which includes a first area 410 for displaying indications 411 based on the assessment data. The assessment data indications 411 can include the assessment data itself, or derivations of the assessment data, such as analysis information generated based on the assessment data. The user interface 310 may access the data repository 330 by interaction with the data module 350, which retrieves, formats, analyzes, and transmits requested or selected data to the user interface 310 for display in the first area 410.

The display 400 also includes a second area 420 for related content items. To display the related content items, a context of the indications 411 shown in the first area 410 of the display 400 is determined and is used to identify content items that are related to the context of the indications 411. For example, the user interface 310 (or user interface module 240) can determine the context of the information shown in first area 410, or the underlying data (for example, student assessment data) used to generate the display in the first area. Once the context of the indications 411 and/or the context of the data upon which the indications 411 are based have been determined, the user interface 310 passes the determined context to the query service module 250 along with a request for related content. In response, the query service module 250 generates an index query based on the determined context. In another example, the user interface 310 transmits a request for related content without first determining the context of the indications 411. In this case, the request includes the indications 411 and/or the assessment data on which the indications 411 are based. After receiving the request for related content, the query service module 250 determines the context of the indications 411 or the assessment data, and generates an index query based on the determined context.

In some implementations, the user interface 310 or user interface module 240 may be designed to analyze assessment data in different formats to determine the context of the information shown, which may then be used for the query. Doing so may allow the system to operate across multiple, different school districts or systems, at least some of which store or generate assessment data in different formats. In other words, the system 100 may not only crawl and index documents in different formats across differently managed school systems, the system 100 may also be designed so that the appropriate queries can be formulated based on assessment data in different formats, which may vary across the different school systems.

For example, one school district may employ a DIBELS and therefore store assessment data in a DIBELS format, while another school district may employ DRA and therefore store data in a DRA format. In some implementations, the user interface 310 (or user interface module 210) is designed to analyze the different formats and look for signatures in the different formats that correspond to a particular context. For instance, the user interface 310 (or user interface module 210) may be designed to analyze DIBELS assessment data and determine a first signature in that data that corresponds to the $2^{nd}$ grade wall context discussed above, and also be designed to analyze DRA assessment data to determine a second signature in that data that also corresponds to the 2nd grade wall context. Thus, in such a scenario, the user interface 310 or user interface module 210 can operate in both environments to determine the same or similar query to obtain the same or similar content related to the context.

The index query is configured to request content related to the generic contexts of the index that relate to the determined context based on analysis of the assessment data and/or information about the data. For example, the assessment data may be assessment data for a particular student in a particular format. The data may provide evidence of certain patterns of information, including patterns of skill levels and/or trends of skill levels, and the data, information, and/or patterns of data and information can be used to determine the context of the indications 411. The query module 250 generates an index query using this determined context, such as a query that requests content related to the pattern of $5^{th}$ grade students who are advanced in math and proficient in English, since this pattern is indicated by the indications 411, as shown in the first area 410 of the display 400. The query module 250 can generated the index query even where the data merely provides the raw assessment scores for math and English, and the query module 250 makes the determination that the raw scores in the particular format indicate the specific categories and values of performance evidenced by the assessment scores (i.e., advanced for math and proficient for English). Additionally, or alternatively, the query module 250 can generate the index query such that content items related to individual topics are identified instead of information related to a pattern. For example, the query module 250 can generate an index query that relates to improving reading comprehension, since the data 412 displayed in area 410 indicates that the student's worst score is in reading comprehension, or because the student obtained an assessment score in reading comprehension that is below a proficient level.

Figure 4:
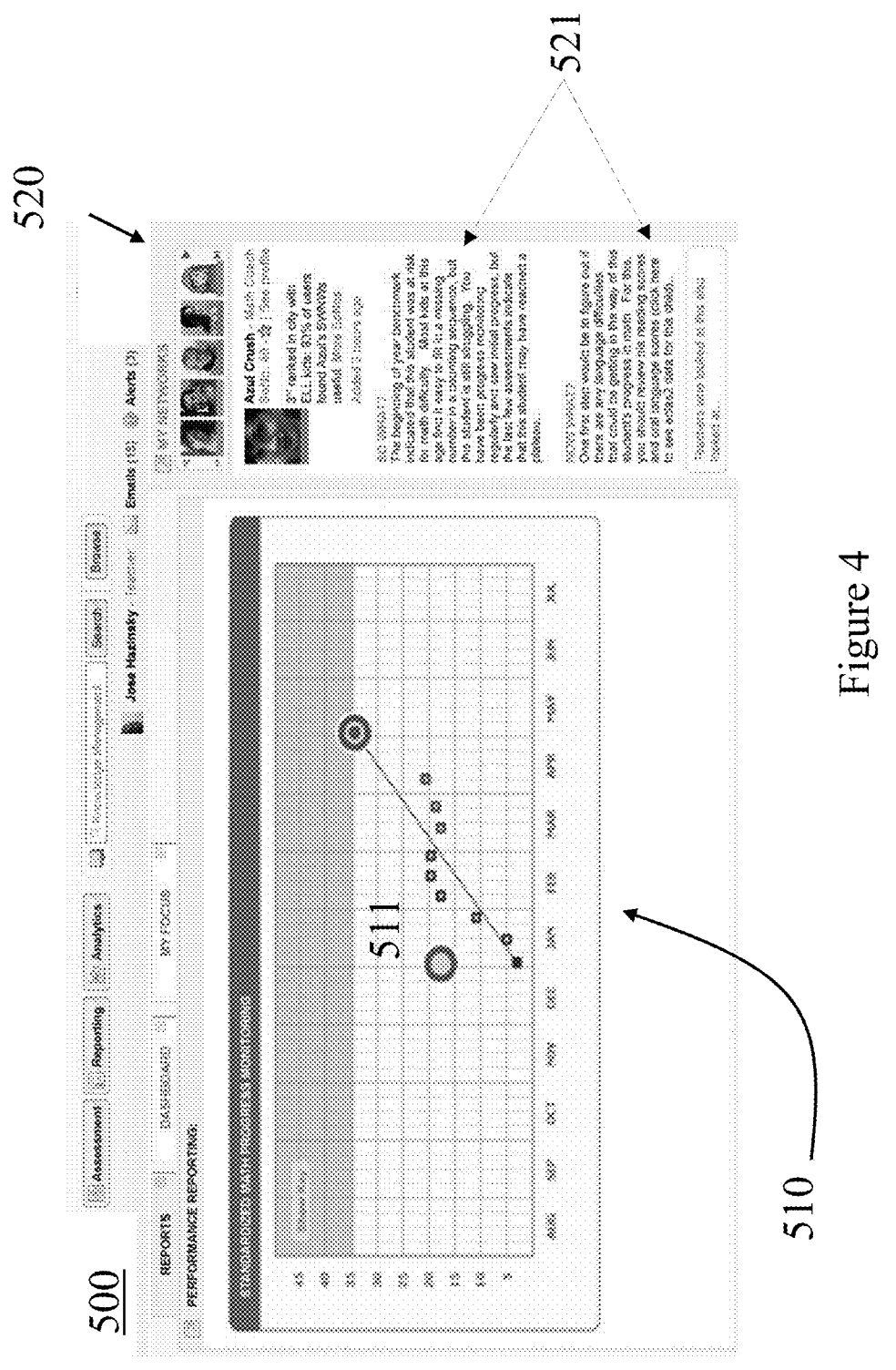

As a further example, the query module 250 can generate a query based on, as illustrated in an area 510 of a display 500 shown in FIG. 4, data 511 that indicates a progression or trend over time in math assessment scores for an individual student, a class, a grade, or a school. Based on the progression or trend, the query module 250 can generate an index query that relates to the particular assessment score levels, the general progression or trend, or patterns of information, such as the score levels and the rate of change of the scores.

Additional information can also be used to identify patterns, such as demographic information of the school, instructor, and/or students that are associated with the scores. For example, the data 511 illustrates a general upward trend, and also illustrates a sharp initial improvement and a subsequent plateau. Either or both of these progressions or trends can be used in pattern identification.

A related content item 521 returned from the query processor 260 is displayed in area 520. The related content 521 is an article authored by another user of the system 100, such as an individual from a different community or organization, and includes interpretive information regarding the significance of the data 511 and/or the progressions or trends exhibited by the data 511. The related content 521 also includes prescriptive information regarding a recommended course of action that can be employed effectively to achieve a desired result for one or more students exhibiting the progressions or trends indicated by the data 511. In some implementations, the related content 521 displayed in the area 520 is the most relevant and/or the highest ranked content that is related to the context of the data 511. Additional or different content can be accessed using a control of the display 500, such as a link, a button, or another control element.

The query processor 260 receives the index query from the query module 250 and performs a query against the index 220 to ascertain relevant content items based on the index query and optionally based on the rankings. If desired, the query processor 260 can return an indication of each of the retrieved related content items. The user interface 310 then uses this information to access UI service module 270 to generate, for example, the second area 420 that includes indications 421 and 423 identifying the related content items (or the similar areas shown in FIGS. 4 and 5). The indications 421 and 423 can also serve as tools for accessing the content items, such as an executable link that, when activated, requests access to an associated related content item. In some implementations, the indications 421 and 423 are text titles or summary descriptions of the related content items. However, icons or other graphical representations, and/or selected portions of the related content items, such as quotations, can be used as at least part of the indications 421 and 423. Referring again to the example above, in response to the index query the query processor 260 may retrieve a text document reflecting the best practices of another instructor and a video demonstration of a class lesson designed to improve reading comprehension skills for $5^{th}$ grade students. The indication 421 includes a representative portion of the text document for review by the instructor and the indication 423 includes a text description and a link for accessing the related video. When activated, the link causes the video to be displayed to the instructor, such as in a new window of the user interface 310.

In addition to the indications 421 and 423 of related content displayed in area 420, the display 400 includes information 425 regarding the author of a selected content item that is associated with one or both of the indications 421 and 423. The information 425 regarding the author is displayed in an area 430 of the display 400, and can include information such as comments from other users on the indicated comment and/or the author generally. For example, an indication 427 that the author is ranked highly among their peers for teaching performance can be displayed. The ranking can be based on analysis of assessment data of the instructor's $5^{th}$ grade students in the area of reading comprehension, since this is the relevant topic. Alternatively, the ranking can be based generally on the instructor's performance data. In some implementations, the information 425 regarding the author of the related content item can be used as a filter, either when selecting the related content, or when displaying the indications 421 and 423 of the related content. For example, only related content items that are authored by an individual who is included in a list of known users, or a user's social network, may be selected. In another example, a related content item may be ranked higher than it would otherwise be ranked based on the author's inclusion in the network. The information about a user's social network may be provided by a social network component 360.

The social network module 360 is operable to create and modify a portion of a user account or profile that defines a social network of other users. In some implementations, the network module 360 may automatically create a network of other users by adding all other users of the same client system 121 to the network of the other users, although other criteria for automatic inclusion and/or exclusion from the network can be used. Additionally, the user can control the inclusion or exclusion of other users from their network by issuing commands to the network module 360 through the user interface 310, for example. A navigational link may be included to access a display for controlling the network module. The query service module 250 may access the social network module 360 to obtain information about a user's social network when ranking or otherwise filtering the results of a query.

Other modules may include a micropayment module that manages disbursement of cash payments, or other forms of payments, to authors who contribute content. For example, the micropayment module can identify which content items are rated highly by users as being helpful or relevant, and can assign a credit in a determined amount to one or more associated authors or institutions based on the ratings. In addition to, or instead of, cash payments, contributing authors can earn credits for materials, services, or the like for the school at which they work, or for a school of their choosing.

Figure 6:
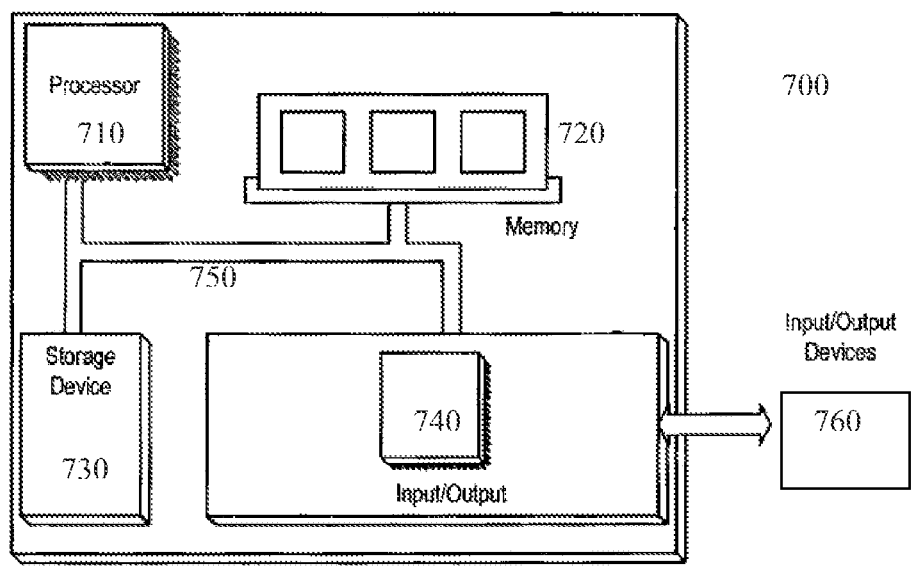
FIG. 6 is a diagram of a general purpose computer system.

Referring now to FIG. 6, a computer system useable in the system 100 includes a processor 710, a memory module 720, a storage device 730, an input/output device 740, and a system bus 750. The processor 710 is operable to execute instructions in the form of a computer program or application stored in the memory module 720 or stored on the storage device 730. Additionally, information can be stored in a data structure in the memory module 720 or on the storage device 730. The input/output device 740 is operable to transmit signals or data from the processor 710, the memory module 720, and/or the storage device 730 to an input/output device 760, and to receive signals or data from an input/output device 760. An input/output device can be a computer network communication device operable to communicate over the Internet, such as a modem. Thus, a computer-implemented process can be carried out using one or more computer system 700 by execution of computer-executable instructions in the form of one or more computer software program.

Figure 7:
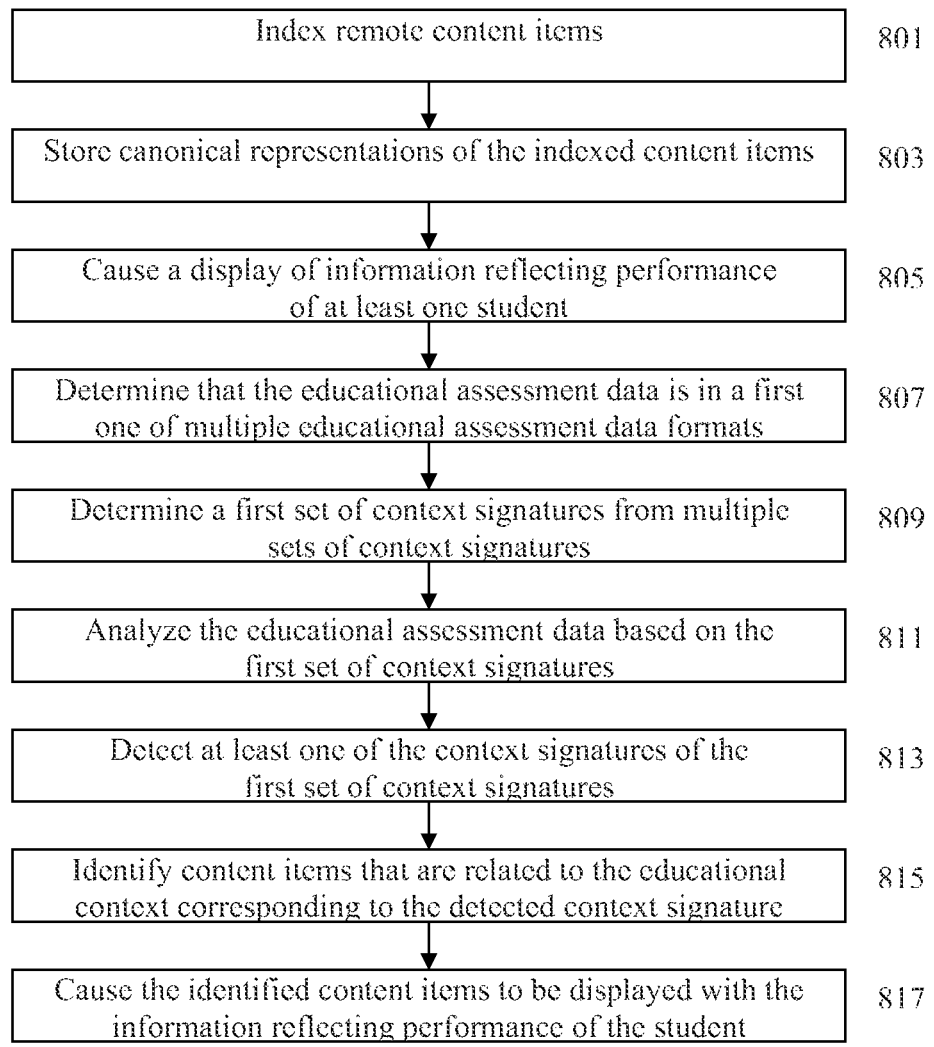
FIG. 7 is a diagram of a process for associating diverse content.

For example, as illustrated in FIG. 7, a computer system, such as a computer system of the related content service system 110, may include instructions that enable the computer system to index remotely-stored content items, such as content items stored in the content repository 320 of the client system 121, among others (801). In some implementations, indexing the content items includes accessing the remote content items and analyzing the remote content items to determine corresponding educational contexts for the remote content items. This can be performed, for example, by identifying tags supplied by an author of the remote content items, and/or by identifying keywords occurring within the remote content items, as described above.

The remotely stored content items may be located in multiple systems that are managed by different school systems that normally do not share information amongst one another. In some implementations where the computer system indexes remote content items from sources that do not share information directly, the computer system can serve as a hub in a network of federated sources of content items and allow users to access content items originating from outside of an organization or other entity with which they are associated, such as from a different school system.

After determining educational contexts for the remote content items, the computer system can update an index, such as the index 220, that associates the determined educational contexts with the corresponding remote content items. In particular, the index can be updated by adding information regarding the determined educational contexts of the analyzed remote content items. The computer system can store a canonical representation of each of the indexed remote content items, such as in the content repository 230 (803).

In another example, a computer system, such as the computer system that performs the indexing and storing described above, can include instructions that enable the computer system to provide a display of selected content items, portions of selected content items, or information relating selected content items to a user based on educational assessment data being displayed or requested. In some implementations, the computer system is configured to cause a display of information reflecting performance of at least one student that is determined based on educational assessment data for the student (805). For instance, a display such as display 400 may be provided, which includes the information reflecting performance of at least one student displayed at area 410. The educational assessment data for the student may be in a first one of multiple educational assessment data formats. For example, the display can be provided to an instructor associated with a first school system that uses a first type of educational assessment that involves assessment data of a first format. The educational assessment data can include data about student performance for at least two tested skills.

The computer system then determines that the educational assessment data for the student is in a first one of the multiple educational assessment data formats (807). Based on the determination that the educational assessment data is in the first educational assessment data format, the computer system determines a first set of context signatures specific to the first educational assessment data format from multiple sets of context signatures corresponding to the multiple educational assessment data formats (809). The context signatures in the first set of context signatures correspond to potential educational contexts of the information reflecting performance of the student. For example, one of the context signatures in the first set can correspond to the $2^{nd}$ grade wall context discussed above.

After determining the first set of context signatures, the computer system analyzes the educational assessment data for the student based on the first set of context signatures to detect at least one of the context signatures (811). Based on the analysis of the educational assessment data, the computer system detects at least one of the context signatures (813) and identifies a set of content items related to the educational context corresponding to the detected context signature (815). For example, if the information regarding student performance includes information regarding performance in decoding and reading comprehension for a $1^{st}$, $2^{nd}$, or $3^{rd}$ grade student, the computer system can determine that the information regarding student performance for the at least two tested skills corresponds to performance levels of the context signature for $2^{nd}$ grade wall, which relates to the two tested skills, i.e., decoding and reading comprehension.

The computer system then causes the identified set of content items to be displayed with the information reflecting performance of the student (817). In some implementations, the computer system ranks the identified content items and causes the identified content items to be displayed the in rank order. For example, the content items can be ranked based on instructor effectiveness information associated with authors of one or more of the identified content items, student performance information associated with authors of one or more of the identified content items, and/or social network information of a user associated with the display of the information reflecting performance of the student.

Additionally or alternatively, the content items can be ranked based on student performance information associated individuals that accessed or otherwise viewed the content items. For example, student performance information for students of an instructor that previously accessed a content item can be used to rank the content item for display to another instructor (for instance, an instructor other than the instructor of the students. For example, an instructor of the students may assign the content to the students for a computer system that notes the students were instructed to and did access the content. This information may be used to track which students accessed the content, and may be used together with student performance information that reflects the students' performance with respect to skills related to the subject matter of the content. The student performance information can include progress information that compares student assessment information for the students before and after the content item was accessed by the student. In another example, students may be able to access their own performance information and related content items can be presented to the students. Subsequent student performance information for the student, including progress information, can be used to rank the content item for display to another student or to another instructor.

When another user views different information reflecting performance of at least one other student that is determined based on educational assessment data for the other student, the process described above with respect to elements 805-817 can be repeated for the second information. Moreover, the computer system is configured to perform these steps even when the educational assessment data for the other student is in a different format. Thus, when the system causes a second display of information that reflects performance of a second student, the system may determine that the educational assessment data for the second student is in a second one of the multiple educational assessment data formats and determine a second set of context signatures specific to the second educational assessment data format from the multiple sets of context signatures. The system then may analyze the second educational assessment data for the second student based on the second set of context signatures and detect at least one of the context signatures of the second set of context signatures. The context corresponding to the detected context signature then may be used to identify related content items, and the system may cause the display of those content items with the information that reflects performance of the second student.

A number of implementations have been described. Nevertheless, it will be understood that various modifications may be made. For example, the foregoing disclosure can be applied to different environments. Thus, content other than educational data and content can be managed to identify and provide access to related pieces of content from within the system. Similarly, different indexing, searching, and/or ranking techniques may be employed in performing the functions described above. Additionally, the various functions can be performed by one or more different components, or components can perform more functions than as described above. For example, in some implementations, the query module 250 can request the crawler 210 to generate the index query, in a manner similar to that described above when analyzing pieces of content. Accordingly, other implementations are within the scope of this disclosure.

The invention claimed is:

1. A system comprising:
one or more processors; and
one or more storage devices, the storage devices including executable instructions that, when executed by one or more processors, cause the system to perform operations including:
accessing multiple content items, wherein each of the content items contain content designed for instructors to improve an instructor's effectiveness in teaching skills related to an educational context that corresponds to a student learning phenomenon;

analyzing, by the one or more processors, the content included in the content items to determine the corresponding educational contexts for the accessed content items;

creating an association between the determined educational contexts and the corresponding content items;

storing the association between the determined educational contexts and the corresponding content items;

providing a first display of first information reflecting performance of a first student, the first information being determined based on first educational assessment data for the first student, the first educational assessment data regarding student performance for at least two tested skills;

determining, by the one or more processors, that the first educational assessment data for the first student is in a first one of multiple educational assessment data formats used by different school systems;

determining, by the one or more processors and based on the determination that the first educational assessment data is in the first educational assessment data format, a first set of context signatures specific to the first educational assessment data format from multiple sets of context signatures corresponding to the multiple educational assessment data formats, wherein the context signatures in the first set of context signatures indicate associations between the educational contexts, that correspond to multiple student learning phenomenon, and particular patterns of performance levels of students between the at least two tested skill for the first educational assessment data format;

analyzing, by the one or more processors, the first educational assessment data for the student based on the first set of context signatures to detect at least one of the context signatures;

based on the analysis of the first educational assessment data, detecting, by the one or more processors, at least one of the context signatures of the first set of context signatures by determining that the student performance for the at least two tested skills for the first student corresponds to a particular pattern of performance levels for the at least two tested skills for the first educational assessment data format that is associated with a particular educational context corresponding to a particular student learning phenomenon, where the particular pattern of performance levels is (i) a deficiency or fluency in a first tested skill of the at least two tested skills and (ii) a deficiency or fluency in a second tested skill of the at least two tested skills;

determining, by the one or more processors, a first educational context corresponding to the detected context signature;

identifying, by the one or more processors and using the determined first educational context corresponding to the detected context signature and the association between the determined first educational context and the corresponding content items, a first set of one or more content items, from among the multiple content items, that are related to the determined first educational context corresponding to the detected context signature;

providing the identified first set of content items for display with the information reflecting performance of the first student;

providing a second display of second information reflecting performance of a second student, the second information being determined based on second educational assessment data for the second student, the second education assessment data regarding student performance for at least two tested skills corresponding to the same at least two tested skills that the first educational assessment data regards;

determining, by the one or more processors, that the second educational assessment data for the second student is in a second one of the multiple educational assessment data formats used by the different school systems, the second educational assessment data format different from the first educational assessment data format;

determining, by the one or more processors and based on the determination that the second educational assessment data is in the second educational assessment data format, a second set of context signatures specific to the second educational assessment data format from the multiple sets of context signatures corresponding to the multiple educational assessment data formats, wherein the context signatures in the second set of context signatures indicate associations between the educational contexts, that correspond to multiple student learning phenomenon, and particular patterns of performance levels of students between the at least two tested skill for the second educational assessment data format;

analyzing, by the one or more processors, the second educational assessment data for the second student based on the second set of context signatures to detect at least one of the context signatures of the second set of context signatures;

based on the analysis of the second educational assessment data, detecting, by the one or more processors, at least one of the context signatures of the second set of context signatures by determining that the student performance for the at least two tested skills for the second student corresponds to the particular pattern of performance levels for the at least two tested skills for the second educational assessment data format that is associated with the particular educational context corresponding to the particular student learning phenomenon, where the detected at least one of the context signatures of the second set of context signatures for the second educational assessment data format corresponds to the same particular student learning phenomenon that the detected at least one of the context signatures of the first set of context signatures for the first educational assessment data format corresponds;

determining, by the one or more processors, a second educational context corresponding to the detected context signature of the second set of context signatures, the second educational context corresponding to the same educational context as the first educational context;

identifying, by the one or more processors, a second set of one or more content items related to the second educational context corresponding to the detected context signature of the second set of context signatures, the identified second set corresponding to the same content items of the first set of first content items; and providing the second set of identified content items for display with the second information reflecting performance of the second student.

2. The system of claim 1, wherein the operations further include:

ranking the content items of the identified first set of content items based on at least one of instructor effectiveness information associated with authors of one or more of the identified content items or student performance information associated with authors of one or more of the content items of the identified first set of content items, and wherein causing the content items of the identified first set of content items to be displayed with the information reflecting performance of the student includes causing the content items of the first set of identified content items to be displayed in rank order.

3. The system of claim 1, wherein:

creating an association between the determined educational contexts and the corresponding content items includes updating an index based on the determined educational contexts, wherein the index associates educational contexts with content items.

4. The system of claim 3, wherein the operations further include storing a canonical representation of each of the accessed content items.

5. The system of claim 4 wherein the accessed content items are located in multiple systems that are managed by different school systems.

6. The system of claim 1, wherein the first information is displayed at a client system associated with a first school system, and wherein the second information is displayed at a second client system associated with a second school system.

7. The system of claim 1 wherein the content items include interpretive information regarding the corresponding educational contexts and prescriptive information regarding a recommended course of action with respect to the corresponding educational contexts.

8. The system of claim 1, wherein based on the analysis of the first educational assessment data, detecting at least one of the context signatures of the first set of context signatures by determining that the student performance for the at least two tested skills for the first student corresponds to a particular pattern of performance levels for the at least two tested skills for the first educational assessment data format that is associated with a particular educational context corresponding to a particular student learning phenomenon, comprises:

determining that the student performance for the first student indicates a particular pattern, for the first education assessment format of fluency in a decoding skill and deficiency in a reading comprehension skill, that is associated with a particular education context that corresponds to a second grade wall learning phenomenon.

9. A computer-implemented method comprising:

accessing multiple content items, wherein each of the content items contain content designed for instructors to improve an instructor's effectiveness in teaching skills related to an educational context that corresponds to a student learning phenomenon;

analyzing the content included in the content items to determine the corresponding educational contexts for the accessed content items;

creating an association between the determined educational contexts and the corresponding content items;

causing a first display of first information reflecting performance of a first student, the first information being determined based on first educational assessment data for the first student, the first educational assessment data regarding student performance for at least two tested skills;

determining, by one or more computing devices, that the first educational assessment data for the first student is in a first one of multiple educational assessment data formats used by different school systems;

determining, by the one or more computing devices and based on the determination that the first educational assessment data is in the first educational assessment data format, a first set of context signatures specific to the first educational assessment data format from multiple sets of context signatures corresponding to the multiple educational assessment data formats, wherein the context signatures in the first set of context signatures indicate associations between the educational contexts, that correspond to multiple student learning phenomenon, and particular patterns of performance levels of students between the at least two tested skill for the first educational assessment data format;

analyzing, by the one or more computing devices, the first educational assessment data for the student based on the first set of context signatures to detect at least one of the context signatures;

based on the analysis of the first educational assessment data, detecting, by the one or more computing devices, at least one of the context signatures of the first set of context signatures by determining that the student performance for the at least two tested skills for the first student corresponds to a particular pattern of performance levels for the at least two tested skills for the first educational assessment data format that is associated with a particular educational context corresponding to a particular student learning phenomenon, where the particular pattern of performance levels is (i) a deficiency or fluency in a first tested skill of the at least two tested skills and (ii) a deficiency or fluency in a second tested skill of the at least two tested skills;

determining, by the one or more computing devices, a first educational context corresponding to the detected context signature;

identifying, using the determined first educational context corresponding to the detected context signature and the association between the determined first educational context and the corresponding content items, a first set of one or more content items, from among the multiple content items, that are related to the determined first educational context corresponding to the detected context signature;

causing the identified first set of content items to be displayed with the information reflecting performance of the first student;

causing a second display of second information reflecting performance of a second student, the second information being determined based on second educational assessment data for the second student, the second education assessment data regarding student performance for at least two tested skills corresponding to the same at least two tested skills that the first educational assessment data regards;

determining, by the one or more computing devices, that the second educational assessment data for the second student is in a second one of the multiple educational assessment data formats used by the different school systems, the second educational assessment data format different from the first educational assessment data format;

determining, by the one or more computing devices and based on the determination that the second educational assessment data is in the second educational assessment data format, a second set of context signatures specific to the second educational assessment data format from the multiple sets of context signatures corresponding to the multiple educational assessment data formats, wherein the context signatures in the second set of context signatures indicate associations between the educational contexts, that correspond to multiple student learning phenomenon, and particular patterns of performance levels of students between the at least two tested skill for the second educational assessment data format;

analyzing, by the one or more computing devices, the second educational assessment data for the second student based on the second set of context signatures to detect at least one of the context signatures of the second set of context signatures;

based on the analysis of the second educational assessment data, detecting, by the one or more computing devices, at least one of the context signatures of the second set of context signatures by determining that the student performance for the at least two tested skills for the second student corresponds to the particular pattern of performance levels for the at least two tested skills for the second educational assessment data format that is associated with the particular educational context corresponding to the particular student learning phenomenon, where the detected at least one of the context signatures of the second set of context signatures for the second educational assessment data format corresponds to the same particular student learning phenomenon that the detected at least one of the context signatures of the first set of context signatures for the first educational assessment data format corresponds;

determining, by the one or more computing devices, a second educational context corresponding to the detected context signature of the second set of context signatures, the second educational context corresponding to the same educational context as the first educational context;

identifying a second set of one or more content items related to the second educational context corresponding to the detected context signature of the second set of context signatures, the identified second set corresponding to the same content items of the first set of first content items; and causing the second set of identified content items to be displayed with the second information reflecting performance of the second student.

10. The method of claim 9, further comprising:
ranking the content items of the identified first set of content items based on at least one of instructor effectiveness information associated with authors of one or more of the identified content items or student performance information associated with authors of one or more of the content items of the identified first set of content items, and
wherein causing the content items of the identified first set of content items to be displayed with the information reflecting performance of the student includes causing the content items of the first set of identified content items to be displayed in rank order.

11. The method of claim 9, further comprising:
creating an association between the determined educational contexts and the corresponding content items includes updating an index based on the determined educational contexts, wherein the index associates educational contexts with content items.

12. The method of claim 11, further comprising storing a canonical representation of each of the accessed content items.

13. The method of claim 12, wherein the accessed content items are located in multiple systems that are managed by different school systems.

14. The method of claim 9, wherein the first information is displayed at a client system associated with a first school system, and wherein the second information is displayed at a second client system associated with a second school system.

15. A tangible non-transitory computer-readable medium having executable instructions stored thereon, the instructions, when executed by one or more processors, cause a content service system to perform operations including:

accessing multiple content items, wherein each of the content items contain content designed for instructors to improve an instructor's effectiveness in teaching skills related to an educational context that corresponds to a student learning phenomenon;

analyzing the content included in the content items to determine the corresponding educational contexts for the accessed content items;

creating an association between the determined educational contexts and the corresponding content items;

causing a first display of first information reflecting performance of a first student, the first information being determined based on first educational assessment data for the first student, the first educational assessment data regarding student performance for at least two tested skills;

determining that the first educational assessment data for the first student is in a first one of multiple educational assessment data formats used by different school systems;

determining, based on the determination that the first educational assessment data is in the first educational assessment data format, a first set of context signatures specific to the first educational assessment data format from multiple sets of context signatures corresponding to the multiple educational assessment data formats, wherein the context signatures in the first set of context signatures indicate associations between the educational contexts, that correspond to multiple student learning phenomenon, and particular patterns of performance levels of students between the at least two tested skill for the first educational assessment data format;

analyzing the first educational assessment data for the student based on the first set of context signatures to detect at least one of the context signatures;

based on the analysis of the first educational assessment data, detecting at least one of the context signatures of the first set of context signatures by determining that the student performance for the at least two tested skills for the first student corresponds to a particular pattern of performance levels for the at least two tested skills for the first educational assessment data format that is associated with a particular educational context corresponding to a particular student learning phenomenon, where the particular pattern of performance levels is (i) a deficiency or fluency in a first tested skill of the at least two tested skills and (ii) a deficiency or fluency in a second tested skill of the at least two tested skills;

determining a first educational context corresponding to the detected context signature;

identifying, using the determined first educational context corresponding to the detected context signature and the association between the determined first educational context and the corresponding content items, a first set of one or more content items, from among the multiple content items, that are related to the determined first educational context corresponding to the detected context signature;

causing the identified first set of content items to be displayed with the information reflecting performance of the first student;

causing a second display of second information reflecting performance of a second student, the second information being determined based on second educational assessment data for the second student, the second education assessment data regarding student performance for at least two tested skills corresponding to the same at least two tested skills that the first educational assessment data regards;

determining that the second educational assessment data for the second student is in a second one of the multiple educational assessment data formats used by the different school systems, the second educational assessment data format different from the first educational assessment data format;

determining, based on the determination that the second educational assessment data is in the second educational assessment data format, a second set of context signatures specific to the second educational assessment data format from the multiple sets of context signatures corresponding to the multiple educational assessment data formats, wherein the context signatures in the second set of context signatures indicate associations between the educational contexts, that correspond to multiple student learning phenomenon, and particular patterns of performance levels of students between the at least two tested skill for the second educational assessment data format;

analyzing the second educational assessment data for the second student based on the second set of context signatures to detect at least one of the context signatures of the second set of context signatures;

based on the analysis of the second educational assessment data, detecting at least one of the context signatures of the second set of context signatures by determining that the student performance for the at least two tested skills for the second student corresponds to the particular pattern of performance levels for the at least two tested skills for the second educational assessment data format that is associated with the particular educational context corresponding to the particular student learning phenomenon, where the detected at least one of the context signatures of the second set of context signatures for the second educational assessment data format corresponds to the same particular student learning phenomenon that the detected at least one of the context signatures of the first set of context signatures for the first educational assessment data format corresponds;

determining a second educational context corresponding to the detected context signature of the second set of context signatures, the second educational context corresponding to the same educational context as the first educational context;

identifying a second set of one or more content items related to the second educational context corresponding to the detected context signature of the second set of context signatures, the identified second set corresponding to the same content items of the first set of first content items; and causing the second set of identified content items to be displayed with the second information reflecting performance of the second student.

16. The tangible computer-readable medium of claim 15, wherein the operations further include:

ranking the content items of the identified first set of content items based on at least one of instructor effectiveness information associated with authors of one or more of the identified content items or student performance information associated with authors of one or more of the content items of the identified first set of content items, and wherein causing the content items of the identified first set of content items to be displayed with the information reflecting performance of the student includes causing the content items of the first set of identified content items to be displayed in rank order.

17. The tangible computer-readable medium of claim 15, wherein the operations further include:

creating an association between the determined educational contexts and the corresponding content items includes updating an index based on the determined educational contexts, wherein the index associates educational contexts with content items.

18. The tangible computer-readable medium of claim 17, wherein the operations further include storing a canonical representation of each of the accessed content items.

19. The tangible computer-readable medium of claim 18, wherein the accessed content items are located in multiple systems that are managed by different school systems.

20. The tangible computer-readable medium of claim 15, wherein the information is displayed at a client system associated with a first school system, and wherein the second information is displayed at a second client system associated with a second school system.

* * * * *